April 1, 1941.　　　G. J. ARENTSEN　　　2,236,932
APPARATUS FOR CONTINUOUSLY MANUFACTURING CORRUGATED
CONSTRUCTION BOARDS
Filed Jan. 27, 1939
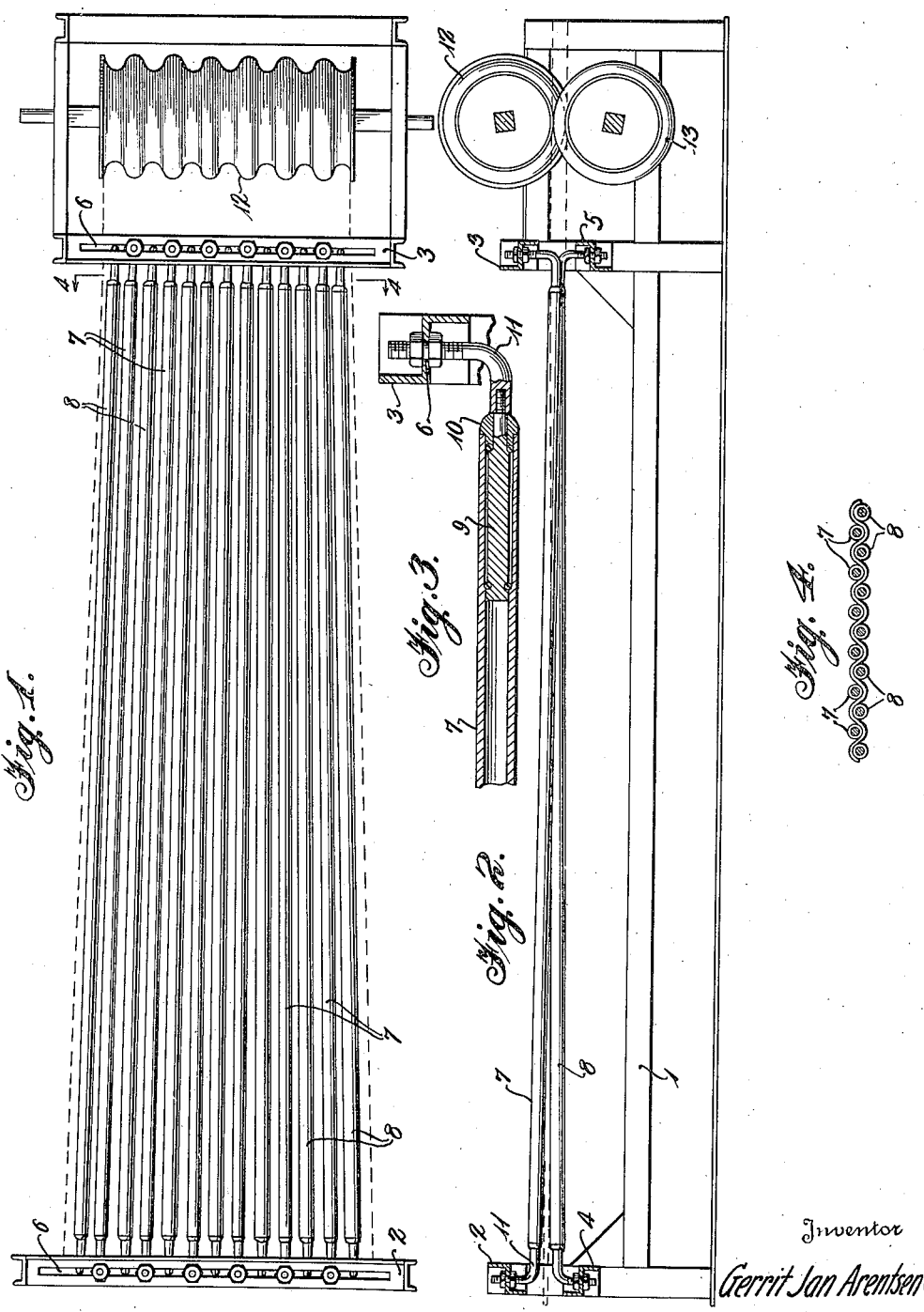
Inventor
Gerrit Jan Arentsen
By Stevens and Davis
Attorneys Patented Apr. 1, 1941

2,236,932

UNITED STATES PATENT OFFICE 2,236,932

APPARATUS FOR CONTINUOUSLY MANUFACTURING CORRUGATED CONSTRUCTION BOARDS

Gerrit Jan Arentsen, Diemerbrug, Netherlands

Application January 27, 1939, Serial No. 253,232
In the Netherlands January 27, 1938

6 Claims. (Cl. 154—30)

The invention relates to a process for continuously manufacturing corrugated construction boards. It has already been proposed to form corrugated construction boards from a more or less plastic strip by guiding said strip between rollers with parts of a greater diameter and co-acting rollers arranged under the first-mentioned rollers in such a way that the parts with larger and smaller diameters of the rollers and the co-acting rollers form the corrugations in the board. It is clear that by forming longitudinal corrugations in the travelling strip of the material the width of the strip is decreased. In order to avoid crooks in the place where the non-corrugated part is formed to the corrugated part the enlarged parts of the rollers are arranged in such a way, that at first the corrugations in the middle of the strip are formed, thereupon the corrugations lying immediately outward of the first mentioned corrugations and so on, until the strip is corrugated over the entire width. However it has appeared that the formation of irregular folds arises in such a way that tearing of the material cannot be prevented, particularly when the same is provided with a reinforcement. When these cracks have been formed it is impossible to close the same again by guiding the strip after the formation of the corrugations between corrugated rollers.

The purpose of the present invention is to avoid these draw-backs and to provide a process for forming corrugated building boards which does not give rise to cracks.

Said object is obtained according to the invention by guiding the strip in a sufficiently plastic state between rollers or rods lying in the direction of movement or about in the direction of movement in two planes in such a way that the rollers or rods at one end lie alternatively above and under the surface of the board and at the other end lie side by side or about side by side. In connection with this the board may be guided between the rollers or rods which converge in the direction of movement with respect to the vertical longitudinal plane.

By the invention the purpose is attained that the board is corrugated over the entire surface at the same time and in a uniform way so that the formation of undesired folds and thereby of cracks is avoided.

The invention further relates to an apparatus for applying the process described here-above, said apparatus being characterized by a number of rollers or rods arranged in such a way in two intersecting planes that at one end the rods lie alternatively above and under the central plane and at the other end lie side by side or about side by side.

According to the invention the rollers or rods may converge with respect to a plane under right angles to the central longitudinal plane. According to a further feature of the invention the ends of the rollers or rods may be adjustable independently in height direction and/or in cross-direction.

The invention is explained here-below with reference to the drawing in which by way of example an embodiment of the apparatus according to the invention is shown.

In the drawing:

Fig. 1 is a top-view of the apparatus in which for clearness sake only the rollers or rods lying above the construction board are shown and all the rollers are shown in vertical cross-section, Fig. 2 is a longitudinal section of the apparatus according to Fig. 1, Fig. 3 is a detail at a larger scale, and Fig. 4 is substantially a transverse vertical sectional view of Fig. 1 taken along the plane indicated by the line 4—4 thereof.

The apparatus shown in the drawing consists in a frame 1 with four cross beams 2, 3, 4 and 5 provided with slots 6. Between these cross beams rollers 7 and 8 respectively are arranged in two intersecting planes, the rollers being adjustable in the following way. A short stationary axle 9 extends in the end of each roller, the axle being provided with a groove at one end for engaging a row of balls; at the other end a cover 10 is shifted on a thinner part and encloses a second row of balls and at the same time provides an abutment for the end of the tubular roller 7. The stationary axle 9 is connected with a hook-shaped support 11 which is provided with screw thread. Said support is fixed by means of nuts in the slot 6 of one of the cross beams so that the support is adjustable in height direction and may be adjusted in the slot in cross direction. In this way it is possible to adjust the ends of the rollers independently in the desired way.

Further the frame carries two rollers 12 and 13 which are provided with corresponding corrugations.

The apparatus works in the following way: A construction board, for instance a reinforced or not-reinforced asbestos-cement board is introduced from the left side of the apparatus between the rollers 7 and 8, said board being still in a sufficiently plastic state. As the surfaces in which the rollers 7 and 8 are lying approach each other corrugations are formed in the plastic board which are getting deeper in proportion as the board approaches the right end of the rollers. In Fig. 4 a part is shown in vertical section showing in which way the board is corrugated by said rollers. After leaving the rollers the corrugated board is guided between cylinders 12 and 13 which subject the board to an extra pressure. At the same time these cylinders exert a pulling force on the board in order to advance the same through the apparatus.

As shown in Fig. 1 the rollers converge from the left to the right. The object is to follow the reduction of the width of the building board which is the result of the corrugations becoming deeper.

In this way it is prevented that the construction board in its still plastic state would form undesired folds which would result in cracks in the surface.

The rollers are easily rotatable by the balls on the stationary axles 9. Thereby the surface of the construction board does not glide over the rollers in cross direction but the rollers rotate by the movement of the construction board. It is clear that thereby the construction board only glides in the direction of movement of the board.

By the adjustability of the ends of the rollers the apparatus is adapted to be adjusted for forming corrugations of different depths when this is required with a view to the material or in connection with the purpose for which the building boards are to be delivered.

I claim:

1. An apparatus for the production of corrugations in material in web form comprising, two banks of converging elongate rigid fingers each freely rotatable about its longitudinal axis, the fingers constituting one bank interdigitating with the fingers constituting the other bank, the point of maximum interdigitation being coincident with the point of maximum convergence of said fingers, and means for continuously drawing a web of material between said banks in a direction toward their point of maximum interdigitation.

2. An apparatus for the production of corrugations in material in web form comprising, two banks of converging elongate rigid fingers each freely rotatable about its longitudinal axis, the fingers constituting one bank interdigitating with the fingers constituting the other bank, the point of maximum interdigitation being coincident with the point of maximum convergence of said fingers, and means for continuously drawing a web of material between said banks in a direction toward their point of maximum interdigitation, said banks and their component fingers being independently adjustable to vary the extent of interdigitation as well as the extent of convergence, whereby to produce corrugations of varying depths.

3. An apparatus for the production of corrugations in material in web form comprising, two opposed banks of rollers, the rollers within each of said banks being arranged with axes of rotation in converging relation, the rollers constituting one bank interdigitating with the rollers constituting the other bank, the point of maximum interdigitation being coincident with the point of maximum convergence of said rollers, and means for continuously drawing a web of material between said banks in a direction toward their point of maximum interdigitation.

4. An apparatus for the production of corrugations in material in web form comprising, two opposed banks of rollers, the rollers within each of said banks being arranged with axes of rotation in converging relation, the rollers constituting one bank interdigitating with the rollers constituting the other bank, the point of maximum interdigitation being coincident with the point of maximum convergence of said rollers, and means for continuously drawing a web of material between said banks in a direction toward their point of maximum interdigitation, said banks and their component rollers being independently adjustable to vary the extent of interdigitation as well as the extent of convergence, whereby to produce corrugations of varying depths.

5. An apparatus for the production of corrugations in material in web form comprising, two banks of converging rollers, said banks being in intersecting planes, the axial length of each roller being substantially greater than its diameter, the rollers of one of said banks interdigitating with the rollers of the other of said banks, the point of maximum interdigitation being coincident with the point of maximum convergence of said rollers in each bank, driven rollers for continuously drawing a web of material between said banks in a direction toward their point of interdigitation and pressing said web after it has been corrugated, means to adjust the banks to vary the angle of intersection, and means to adjust said rollers independently to vary their extent of convergence, whereby corrugated webs having corrugations of varying depths may be produced.

6. Apparatus useful in manufacture of longitudinally corrugated continuous webs comprising a supporting frame; means for continuously moving a web through the frame; banks of freely rotatable elongate smooth cylindrical members, the members within each of said banks converging within a common plane, the banks being disposed on opposite sides of the path of movement of a web within the frame in a manner such that end portions of the members in the respective banks interdigitate, each at the place of maximum convergence.

GERRIT JAN ARENTSEN.